(No Model.)
G. HEIDEL & G. FREY.
SELF HEATING SOLDERING IRON.
No. 400,455. Patented Apr. 2, 1889.
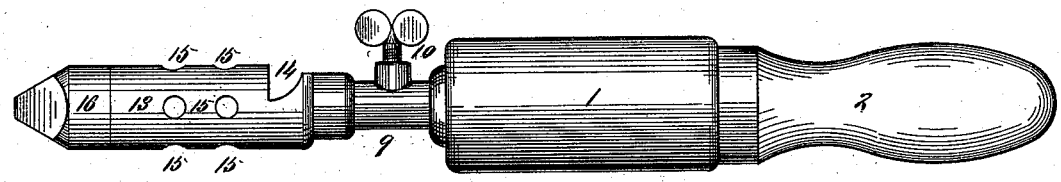
Fig. I.
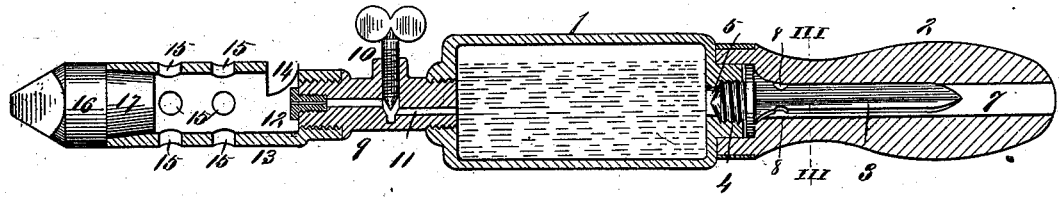
Fig. II.
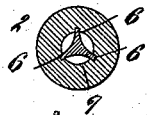
Fig. III.
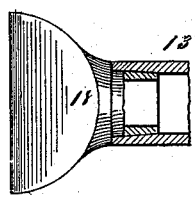
Fig. IV.
Fig. V.
Attest:
E. Arthur.
S. H. Knight.
Inventors:
Gustavus Heidel
Gustave Frey
By Knight Bros
attys

UNITED STATES PATENT OFFICE.

GUSTAVOS HEIDEL AND GUSTAVE FREY, OF ST. LOUIS, MISSOURI, ASSIGNORS, BY MESNE ASSIGNMENTS, TO THE NATIONAL SELF-HEATING SAD-IRON COMPANY, OF SAME PLACE.

SELF-HEATING SOLDERING-IRON.

SPECIFICATION forming part of Letters Patent No. 400,455, dated April 2, 1889.

Application filed May 22, 1888. Serial No. 274,668. (No model.)

*To all whom it may concern:*

Be it known that we, GUSTAVOS HEIDEL and GUSTAVE FREY, both of the city of St. Louis, in the State of Missouri, have invented a certain new and useful Improvement in Self-Heating Soldering-Irons, &c., of which the following is a full, clear, and exact description, reference being had to the accompanying drawings, forming part of this specification, and in which—

Figure I is a side elevation of our improved self-heating iron. Fig. II is a longitudinal section. Fig. III is a transverse section taken on line III III, Fig. II. Fig. IV is a detail side view showing a paint-burner. Fig. V is a detail front view showing a branding-die which may be used in connection with our invention.

Our invention relates to an improved self-heating device, which may be used as a soldering-iron or as a paint-burner or as a branding-iron; and it may also be used for other purposes without departing from the spirit of the invention.

Our invention consists in features of novelty hereinafter fully described, and pointed out in the claims.

Referring to the drawings, 1 represents a reservoir or tank, to which is secured a handle, 2. The handle is preferably made of wood, and is secured to the reservoir by a shank, 3, having a screw-neck, 4, fitting in a socket, 5, in the outer end of the reservoir. The shank 3 fits in an opening, 7, of the handle 2, and is preferably made with three wings, 6, (see Fig. III,) which pierce the wood of the handle and hold it firmly on the shank. The wings are notched, as shown at 8, at their inner ends, and the object of this construction is to allow a circulation of air through the opening 7 between the wings and through the openings 8, to avoid the heating or burning of the handle. Secured to the front end of the reservoir is a short piece of pipe, 9, having a valve, 10, to regulate the flow of the liquid (gasoline preferably being used as a heating medium) through the passage 11 of the pipe. Secured to the front end of the pipe is a nipple or jet, 12. Secured to the inner end of the pipe 9 is a cylinder or chamber, 13, having near its outer ends a flaring inner wall. This cylinder or chamber is notched out, as shown at 14, to afford means for igniting the fuel at the jet or nipple.

15 represents perforations or holes in the cylinder for the passage of air to aid combustion. Secured to the inner end of the cylinder is a point, 16, having a frusto-conical extension, 17, that fits into the outer flaring end of the cylinder, and is complementary therewith. The outer walls of the point and cylinder are continuous, so as to form a neat joint, the point having a shoulder to fit the end of the cylinder. This point is applied when the instrument is to be used as a soldering-iron, and it is thoroughly heated by the combustion in the cylinder. If desired, the point 16 may be removed and a flaring point, 18, (see Fig. IV,) inserted, when the instrument is to be used as a paint-burner; or, instead of either of these points, a branding-die, 19, (see Fig. V,) may be inserted.

Still other forms of points might be inserted to adapt the instrument for still other purposes.

The device is a cheap, simple, and durable self-heating affair, being portable and easily handled.

We claim as our invention—

1. In a self-heating soldering-iron, &c., the combination of the reservoir, handle secured to one end of the reservoir, pipe secured to the other end of the reservoir, and a cylinder provided with a point secured to the pipe, the handle having a central opening and being connected to the reservoir by means of a shank having wings to allow the circulation of air, substantially as and for the purpose set forth.

2. In a self-heating soldering-iron, &c., the combination of the reservoir, handle secured to one end of the reservoir, pipe secured to the other end of the reservoir, and a cylinder having a point secured to the pipe, the handle having a central opening and connected to the reservoir by means of a shank having wings 6 and notches 8, substantially as and for the purpose set forth.

GUSTAVOS HEIDEL.
GUSTAVE FREY.

In presence of—
GEO. H. KNIGHT,
JOS. WAHLE.